US011606898B2

(12) United States Patent
Heide et al.

(10) Patent No.: US 11,606,898 B2
(45) Date of Patent: Mar. 21, 2023

(54) MOWER HYDRAULIC LEAK DETECTION SYSTEM

(71) Applicant: DEERE & COMPANY, Moline, IL (US)

(72) Inventors: Paul R. Heide, Boone, NC (US); Bradley P. Aldridge, Clayton, NC (US); Brent G. Rinholm, Fuquay Varina, NC (US); David A. Straka, Willow Spring, NC (US)

(73) Assignee: DEERE & COMPANY, Moline, IL (US)

( * ) Notice: Subject to any disclaimer, the term of this patent is extended or adjusted under 35 U.S.C. 154(b) by 459 days.

(21) Appl. No.: 16/802,406

(22) Filed: Feb. 26, 2020

(65) Prior Publication Data

US 2021/0259151 A1 Aug. 26, 2021

(51) Int. Cl.
*A01D 34/60* (2006.01)
*A01D 34/00* (2006.01)
*A01D 34/54* (2006.01)
*G01M 3/02* (2006.01)
A01D 34/44 (2006.01)
A01D 101/00 (2006.01)

(52) U.S. Cl.
CPC ........... *A01D 34/60* (2013.01); *A01D 34/008* (2013.01); *A01D 34/54* (2013.01); *G01M 3/02* (2013.01); *A01D 34/44* (2013.01); *A01D 2101/00* (2013.01)

(58) Field of Classification Search
CPC ............ A01D 2034/6831; A01D 34/00; A01D 34/001; A01D 34/006; A01D 34/246; A01D 34/38; A01D 34/40; A01D 34/42; A01D 34/008; A01D 34/54; A01D 34/60; A01D 34/62; A01D 34/80; A01D 34/82; A01D 2101/00; A01D 75/18; A01D 69/03; G01F 23/00–808
See application file for complete search history.

(56) References Cited

U.S. PATENT DOCUMENTS 4,591,837 A * 5/1986 Martinez ................ A01D 34/60
73/302
5,254,976 A 10/1993 Schueler
(Continued)

FOREIGN PATENT DOCUMENTS

EP 0832011 10/2001
WO WO2014055731 A1 4/2014

OTHER PUBLICATIONS

Extended European Search Report and Written Opinion issued in European Patent Application No. 21154293.1, dated Jul. 19, 2021, in 14 pages.

*Primary Examiner* — Adam J Behrens

(57) ABSTRACT

A hydraulic leak detection system includes a leak detection switch responsive to a level of hydraulic fluid in a tank used by a hydraulic mowing circuit and a lift and lower circuit of a grass mowing machine. The system includes a controller that activates a warning indicator if the leak detection switch indicates the level of hydraulic fluid in the tank is low, but allows the hydraulic mowing circuit and the lift and lower circuit to continue operating until the lift and lower circuit reaches a fully raised position. A solenoid valve may control the level of hydraulic fluid in the tank based on temperature of the hydraulic fluid.

9 Claims, 5 Drawing Sheets

(56) References Cited

U.S. PATENT DOCUMENTS

| | | | | |
|---|---|---|---|---|
| 5,402,110 | A | * | 3/1995 | Oliver .................... G01F 25/20 |
| | | | | 73/290 R |
| 5,548,278 | A | * | 8/1996 | Oliver .................... G01F 23/72 |
| | | | | 73/290 R |
| 5,673,025 | A | * | 9/1997 | Refugio .............. G01M 3/3245 |
| | | | | 73/290 R |
| 5,703,569 | A | * | 12/1997 | Oliver ................ G01M 3/3245 |
| | | | | 73/290 R |
| 5,744,701 | A | | 4/1998 | Peterson et al. |
| 5,748,077 | A | | 5/1998 | Brandt |
| 6,230,089 | B1 | * | 5/2001 | Lonn .................. G01M 3/3245 |
| | | | | 714/E11.182 |
| 6,696,960 | B1 | * | 2/2004 | Martinez ............... B60T 17/221 |
| | | | | 340/450.1 |
| 7,484,409 | B2 | | 2/2009 | Dykstra et al. |
| 7,696,445 | B2 | | 4/2010 | Bungo et al. |
| 8,827,000 | B2 | | 9/2014 | Aldridge et al. |
| 9,462,746 | B1 | * | 10/2016 | Gerhardson ......... A01D 34/006 |
| 2006/0137429 | A1 | * | 6/2006 | Henschel ............... G01F 23/32 |
| | | | | 73/1.73 |
| 2021/0285842 | A1 | * | 9/2021 | Nelson ................... E02F 9/267 |

* cited by examiner

MOWER HYDRAULIC LEAK DETECTION SYSTEM

FIELD OF THE INVENTION

This invention relates generally to grass mowing machines, and specifically to a hydraulic leak detection system for a riding greensmower, trim and surround mower or fairway mower.

BACKGROUND OF THE INVENTION

Grass mowing machines such as riding greensmowers, trim and surround mowers and fairway mowers may include internal combustion engines to power a hydrostatic traction drive circuit, hydraulic mowing circuit, hydraulic circuit to raise and lower the cutting units, and one or more other hydraulic circuits.

In the past, hydraulic leak detectors have been used to warn the operator if a leak is detected, usually based on low hydraulic fluid level. Some leak detectors require the operator to turn off one or more hydraulic circuits that may be leaking hydraulic fluid. As a result, the operator may need to disable the hydraulic mow circuit (or PTO) during operation, increasing the risk of turf damage caused by the leak. Alternatively, some operators may ignore a hydraulic leak warning and continue mowing and leaking hydraulic fluid on the turf.

A hydraulic leak detection system is needed that does not require an operator to turn off hydraulic circuits that may be leaking hydraulic fluid immediately. A hydraulic leak detection system is needed that does not require the operator to disable the hydraulic mow circuit (or PTO) during operation. A hydraulic leak detection system is needed that does not allow operators to ignore a leak warning or continue mowing and leaking hydraulic fluid on the turf.

SUMMARY OF THE INVENTION

A hydraulic leak detection system includes a vehicle controller electrically connected to a leak detection switch. The vehicle controller receives a signal if the leak detection switch detects the hydraulic fluid level is low, activates the warning device in response to the signal, and allows operation of the hydraulic mowing circuit until the plurality of grass cutting units are fully raised by the lift and lower circuit, and then stops the hydraulic mowing circuit and blocks the lift and lower circuit from lowering the grass cutting units. A solenoid valve with a temperature sensor increases the hydraulic fluid level in the sensing chamber if the temperature sensor indicates a hydraulic fluid temperature lower than a calculated reduced temperature. The hydraulic leak detection system does not require an operator to turn off hydraulic circuits that may be leaking hydraulic fluid immediately, does not require the operator to disable the hydraulic mow circuit (or PTO) during operation, and does not allow operators to ignore a leak warning or continue mowing and leaking hydraulic fluid on the turf.

BRIEF DESCRIPTION OF THE DRAWINGS

FIG. 3 comprises FIG. 3A and FIG. 3B.

DESCRIPTION OF THE PREFERRED EMBODIMENT

Figure 1:
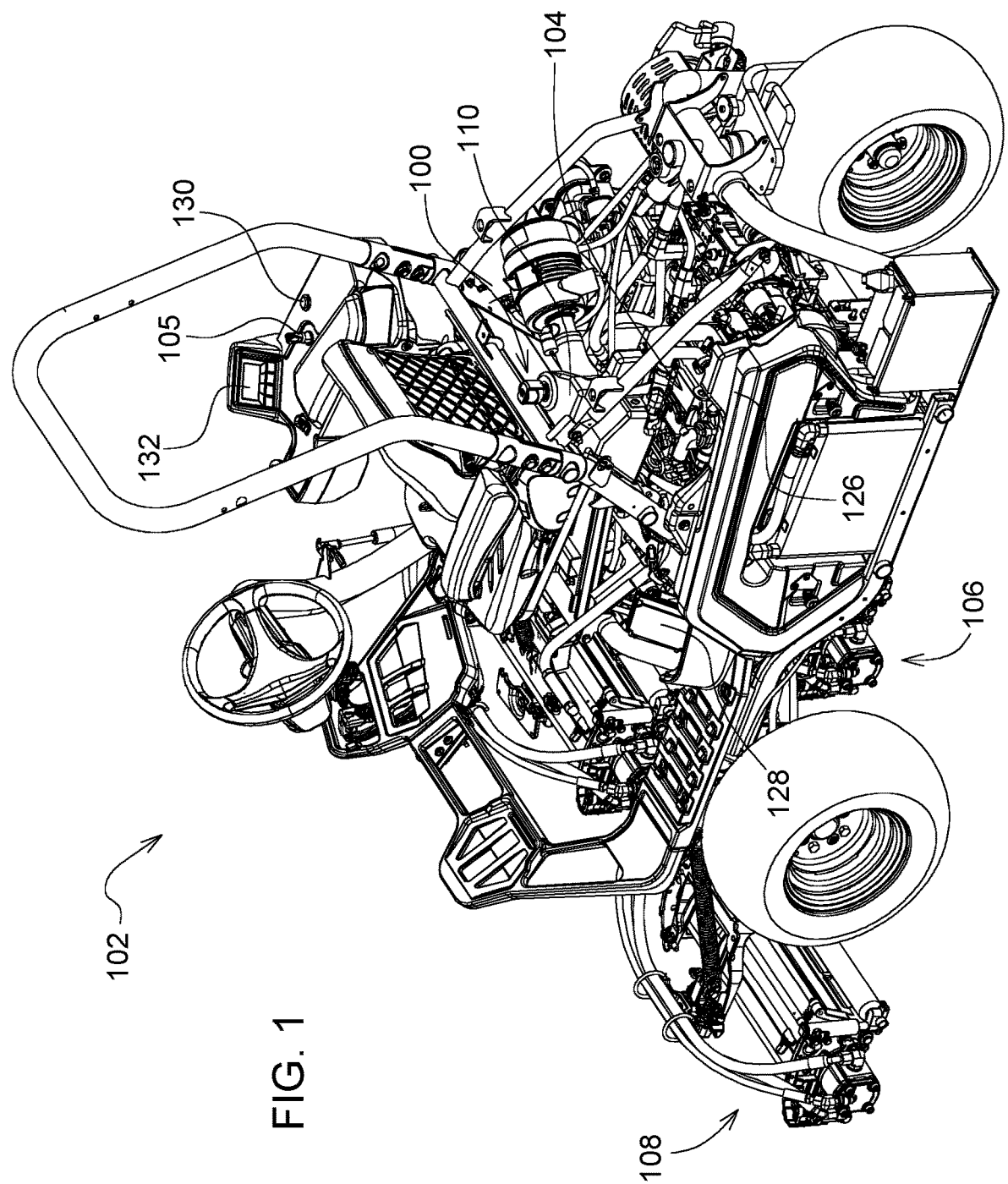
FIG. 1 is a perspective view of a riding greensmower with a hydraulic leak detection system according to one embodiment of the invention.

In one embodiment shown in FIG. 1, hydraulic leak detection system 100 may be on riding greensmower 102 having three or more reel cutting units, or on a trim and surround mower or fairway mower with multiple reel cutting units. The mower may be powered by internal combustion engine 104, and may have a hydrostatic traction drive circuit 106, hydraulic mow circuit 108, and/or hydraulic lift and lower circuit 109 for the cutting units.

Figure 2:
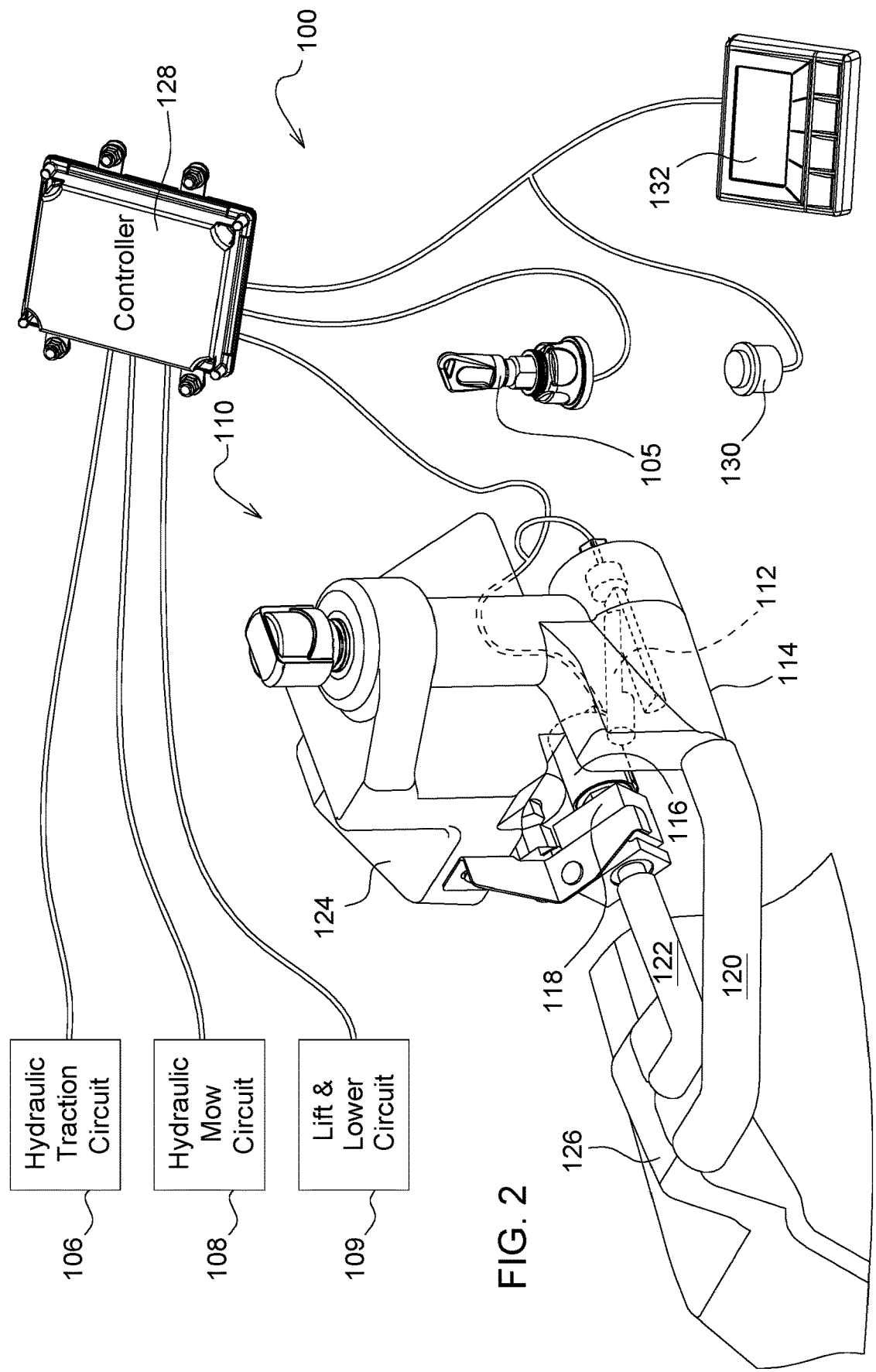
FIG. 2 is a perspective view of the hydraulic leak detection system according to one embodiment of the invention.

In one embodiment shown in FIG. 2, hydraulic leak detection system 100 may include auxiliary hydraulic tank 110 and leak detection switch 112 for sensing the level of hydraulic fluid in sensing chamber 114. The leak detection switch may be a level switch that may pivot to a horizontally aligned closed position to provide a voltage signal indicating hydraulic fluid level is at or below the level switch.

In one embodiment shown in FIG. 2, the hydraulic leak detection system may include solenoid valve 116 which may be activated by hydraulic fluid temperature sensor 118. The solenoid valve may reset the hydraulic fluid level in the sensing chamber to compensate for expansion or contraction of hydraulic fluid due to temperature. Instead of incorrectly detecting a leak, the solenoid valve may raise the level of hydraulic fluid in the sensing chamber if the hydraulic fluid temperature decreases more than a calculated reduced temperature. The hydraulic leak detection system also may include hydraulic hoses 120, 122 connecting the sensing chamber and overflow reservoir 124 to main hydraulic tank 126. For example, hydraulic fluid from the overflow reservoir and/or main hydraulic tank may be used by the solenoid valve to raise the level of hydraulic fluid in the sensing chamber.

In one embodiment shown in FIG. 2, the hydraulic leak detection system may include vehicle controller 128 connected to key switch 105, hydraulic traction circuit 106, hydraulic mow circuit 108, lift and lower circuit 109, leak detection switch 112, solenoid valve 116, alarm 130 and display 132. The hydraulic leak detection system alerts the operator with audible and visual hydraulic leak warnings if the leak detection switch is closed, but does not disable the cutting units immediately. For example, the controller allows continued use of the mowing circuit until the cutting units are fully raised. Thus, the hydraulic leak detection system does not disable the mowing circuit or lift and lower circuit immediately, but allows operation of the cutting units until the operator finishes a cycle of the PTO and fully raises the cutting units. For example, the operator may finish a cycle of the PTO by completing the current mowing pass of a green and then lifting the cutting units. Once the operator uses the lift and lower circuit to fully raise the cutting units, the hydraulic leak detection system turns off the hydraulic mowing circuit for the cutting units, and does not allow the lift and lower circuit to lower the cutting units or the mowing circuit to be used until turning off the key switch. This requires the operator to investigate the nature of the leak instead of ignoring it and continuing to leak hydraulic fluid onto the turf. As a result, the hydraulic leak detection system effectively reduces the amount of hydraulic fluid that can leak onto a golf course, preventing costly turf repairs.

Figure 3A:
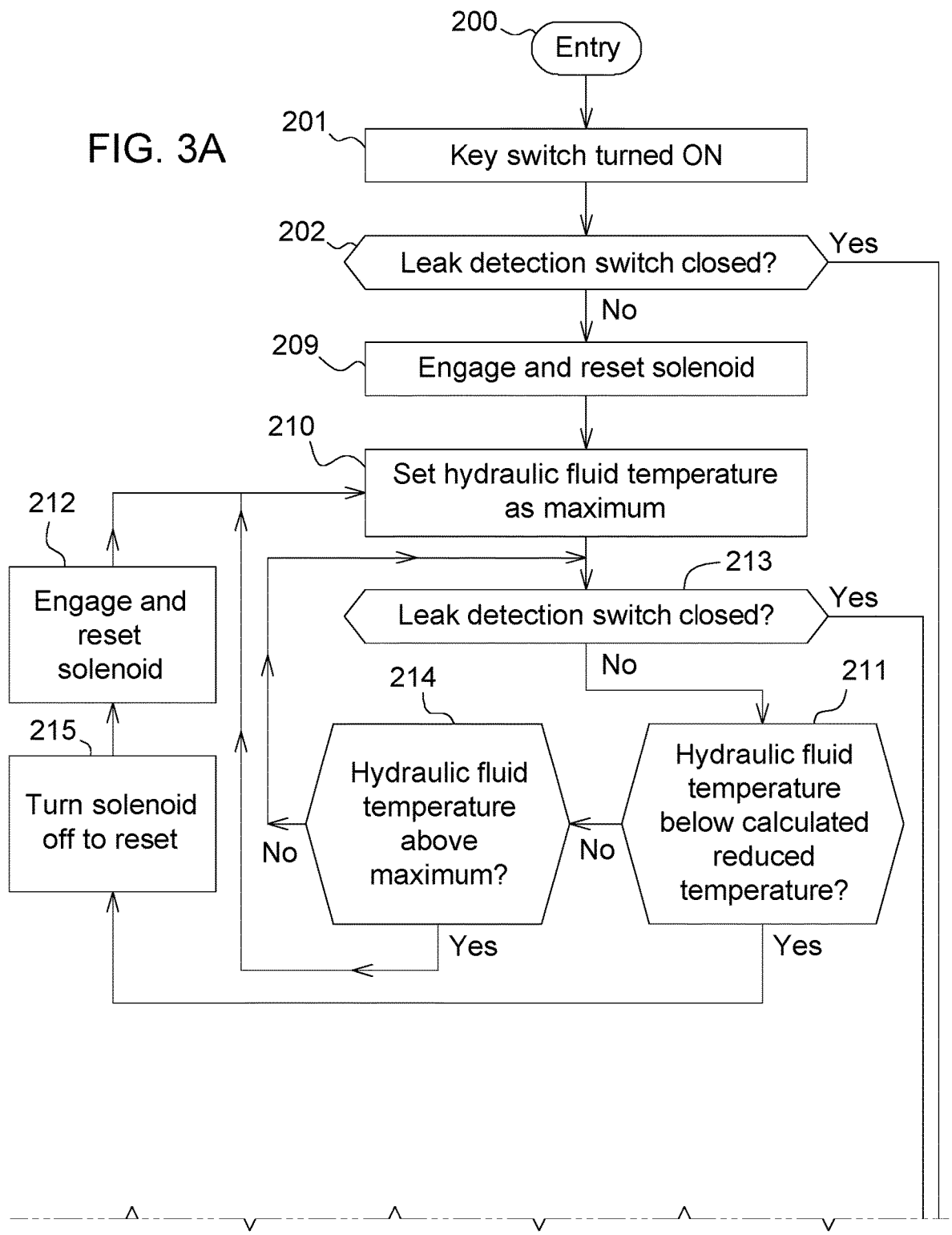
FIG. 3A is the first part of a logic diagram of the hydraulic leak detection system according to one embodiment of the invention.
Figure 3B:
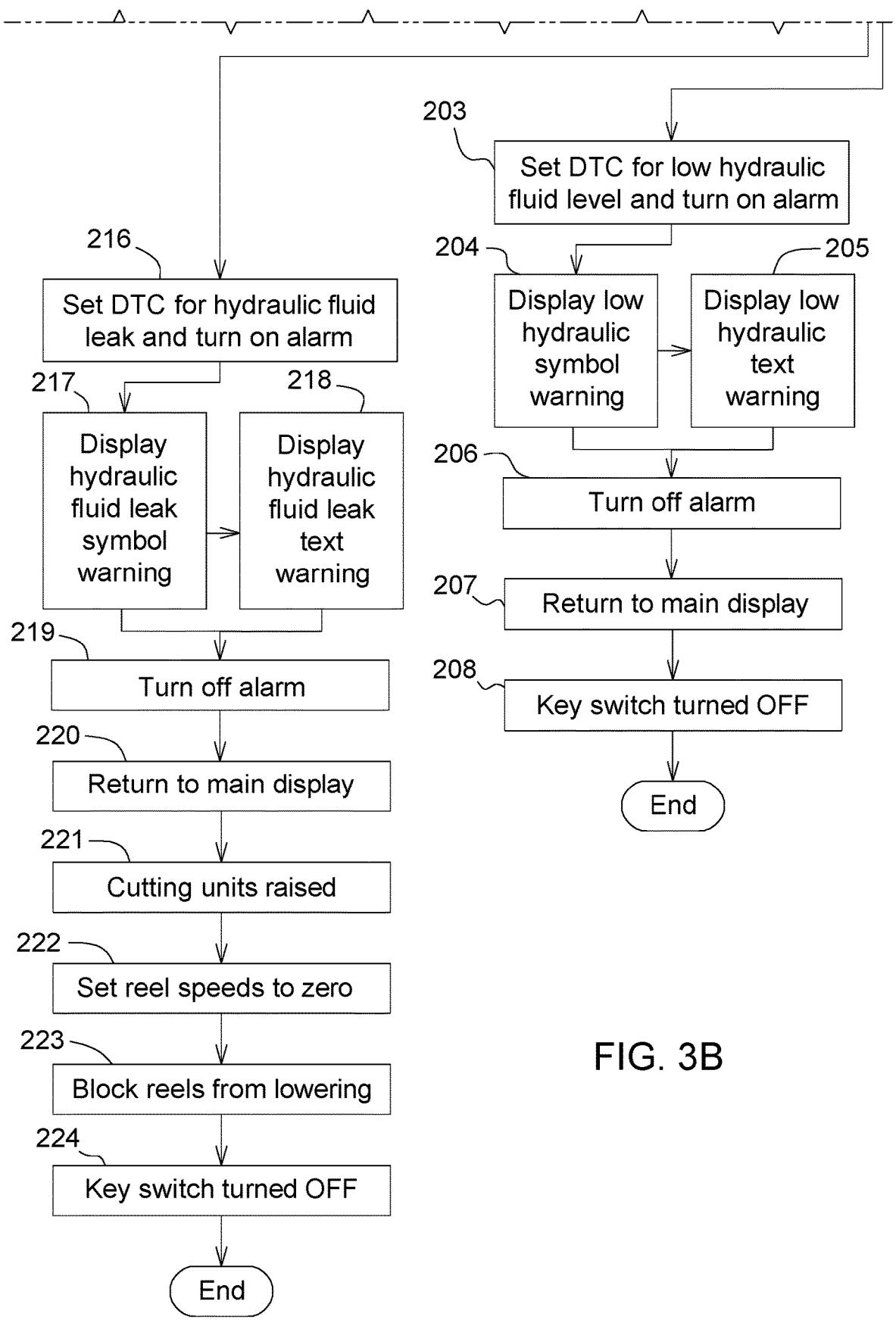
FIG. 3B is the second part of a logic diagram of the hydraulic leak detection system according to one embodiment of the invention.

In an embodiment of FIGS. 3A and 3B, the hydraulic leak detection system may include control logic that the vehicle controller may enter in block 200. When key switch 105 is turned on in block 201, the leak detection switch may be checked once in block 202. For example, the leak detection switch may be closed if the hydraulic fluid level is low. The leak detection switch may pivot down to a horizontal position, reducing sensed voltage below a threshold for a specified persistence period. If the leak detection switch is closed when the key switch is turned on, the controller may set a diagnostic trouble code (DTC) and turn on an audible warning alarm in block 203, and also display a low hydraulic fluid warning symbol in block 204. The operator also may select a text warning in block 205. The alarm may be turned off in block 206, and may operate the mowing circuit and lift and lower circuit with the low oil warning on the main display in block 207. The key switch may be turned off in block 208.

Still referring to FIGS. 3A and 3B, if the leak detection switch was not closed in block 202 when the key switch was turned on, the solenoid may be engaged and reset in block 209. The hydraulic fluid temperature may be set as the maximum temperature in block 210. If the leak detection switch is closed in block 213, the controller may set a DTC and turn on the audible warning alarm in block 216, and also display a hydraulic leak warning symbol in block 217. The operator also may select a text warning in block 218. The alarm may be turned off in block 219, with the hydraulic leak warning on the main display in block 220. In block 221, the controller may check if the cutting units have been raised. If the cutting units are raised, the reel speeds may be set to zero in block 222, and prevented from lowering in block 223. The key switch then may be turned off in block 224.

Still referring to FIGS. 3A and 3B, if the leak detection switch is not closed in block 213, the hydraulic fluid temperature may be compared to a calculated reduced temperature in block 214. For example, the calculated reduced temperature may be the previous maximum minus a temperature reduction for a persistence period. If the hydraulic fluid temperature is lower than the calculated reduced temperature, the solenoid may be reset to raise the hydraulic fluid level in the sensing chamber in block 215. The solenoid then may be engaged and reset in block 212. If the hydraulic fluid temperature is not lower than the calculated reduced temperature, but is greater than the maximum in block 211, the hydraulic fluid temperature may be set as the maximum in block 210.

Having described a preferred embodiment, it will become apparent that various modifications can be made without departing from the scope of the invention as defined in the accompanying claims.

The invention claimed is:

1. A hydraulic leak detection system, comprising:
a vehicle controller electrically connected to a leak detection switch, a warning device, a hydraulic mowing circuit, and a lift and lower circuit for a plurality of grass cutting units;
the vehicle controller configured to receive a signal if the leak detection switch detects a hydraulic fluid level is low, activate the warning device in response to the signal, allow operation of the hydraulic mowing circuit until the plurality of grass cutting units are fully raised by the lift and lower circuit, and then stop the hydraulic mowing circuit and block the lift and lower circuit from lowering the grass cutting units.

2. The hydraulic leak detection system of claim 1 further comprising a hydraulic fluid sensing chamber where the leak detection switch is positioned.

3. The hydraulic leak detection system of claim 2 further comprising a solenoid valve with a temperature sensor that increases the hydraulic fluid level in the sensing chamber if the temperature sensor indicates a hydraulic fluid temperature lower than a calculated reduced temperature.

4. The hydraulic leak detection system of claim 1 wherein the vehicle controller receives a signal if the leak detection switch detects the hydraulic fluid level is low when a key switch is turned on.

5. The hydraulic leak detection system of claim 4 wherein the vehicle controller allows the lift and lower circuit to lower the grass cutting units and displays a low hydraulic fluid level warning if the leak detection switch detects the hydraulic fluid level is low when the key switch is turned on.

6. A hydraulic leak detection system, comprising:
a leak detection switch responsive to a level of hydraulic fluid in a tank used by a hydraulic mowing circuit and a lift and lower circuit of a grass mowing machine; and
a controller connected to the leak detection switch, a warning indicator, the hydraulic mowing circuit, and the lift and lower circuit; the controller configured to activate the warning indicator if the leak detection switch indicates the level of hydraulic fluid in the tank is low, allow the hydraulic mowing circuit and the lift and lower circuit to continue operating until the lift and lower circuit reaches a fully raised position, and disable the hydraulic mowing and the lift and lower circuits thereafter.

7. The hydraulic leak detection system of claim 6 further comprising a plurality of grass cutting reels operated using the hydraulic mowing circuit and the lift and lower circuit.

8. The hydraulic leak detection system of claim 6 wherein the warning indicator includes an audible alarm.

9. The hydraulic leak detection system of claim 6 further comprising a solenoid valve that controls the level of hydraulic fluid in the tank based on temperature of the hydraulic fluid.

* * * * *